Nov. 5, 1957 H. T. CARTER 2,812,386
INTERRUPTER CIRCUIT
Filed July 13, 1954
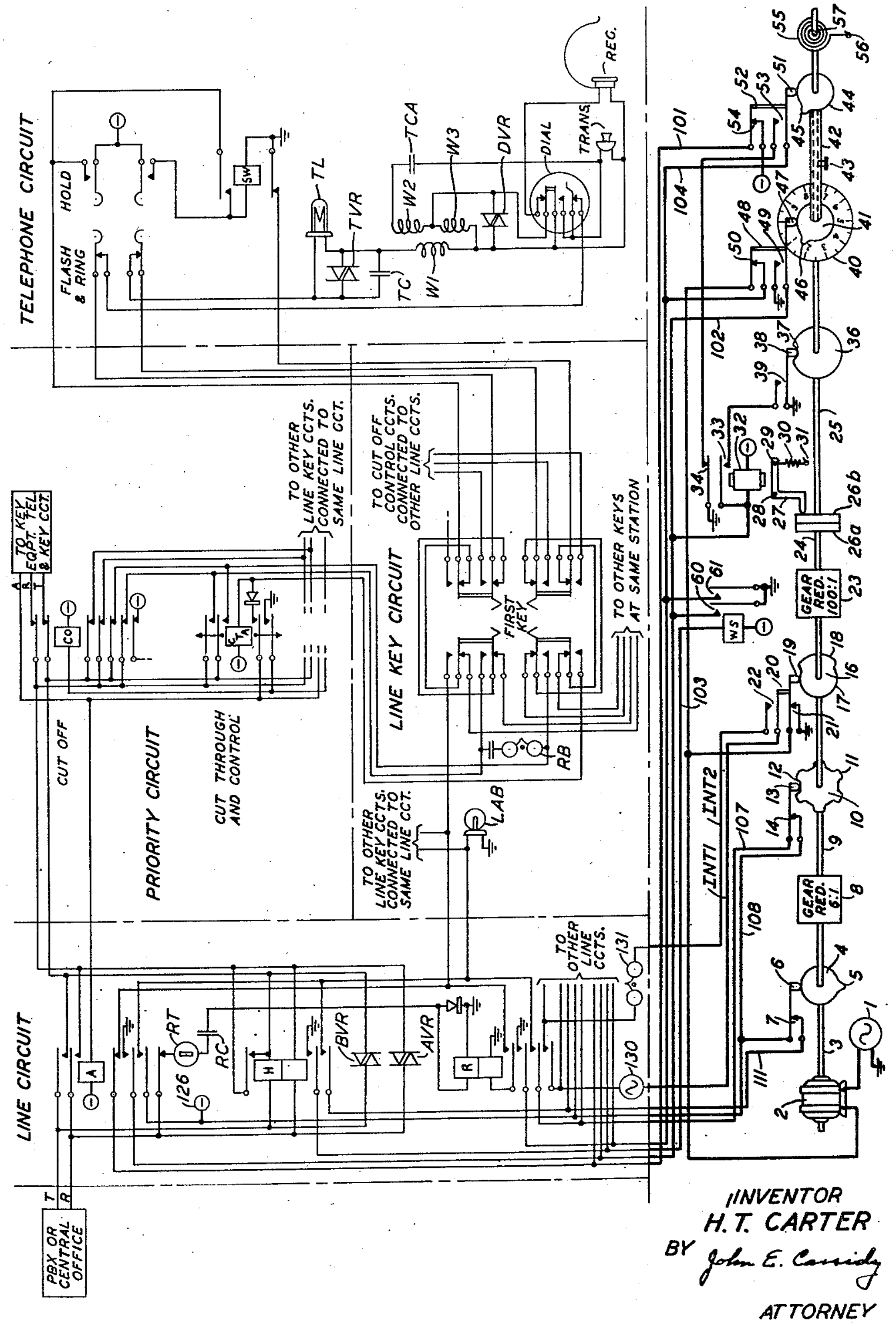
INVENTOR
H. T. CARTER
BY John E. Cassidy
ATTORNEY 2,812,386
Patented Nov. 5, 1957

2,812,386

INTERRUPTER CIRCUIT

Herman T. Carter, Madison, N. J., assignor to Bell Telephone Laboratories, Incorporated, New York, N. Y., a corporation of New York Application July 13, 1954, Serial No. 443,075

9 Claims. (Cl. 179—99)

This invention relates to improvements in key telephone systems. Key telephone systems are telephone systems employed on multistation telephone subscriber premises in lieu of small manual private branch exchanges as well as small automatic private branch exchanges which they are widely replacing to save the expense of an operator required when small manual private branch exchanges are employed and to save the cost of the automatic equipment and its relatively high maintenance charges.

In manual private branch exchange service, as is well understood, the lines and trunks incoming from distant points, such as from central telephone switching offices, extend through the relay control equipment on the subscriber premises to terminations in jacks and lamps at an operator's position in a switchboard. The subscriber station circuits on the subscriber premises also extend through signal control equipment and terminate in jacks and lamps at the switchboard. The switchboard is generally equipped with cord circuits which permit the flexile connection of the stations to the lines and permit the flexible connection also of the stations to other stations on the premises. In certain small special types of manual private branch exchanges, key circuits may be employed instead of cords to perform the switching operations. However both of these types of switchboards obviously require the services of an operator at the switchbord to establish the connections.

There are available also automatic private branch exchanges to which the lines and trunks from remote points as well as the local station circuits on the premises are connected and by means of which the switching is performed automatically in response to dialing. Automatic private branch exchanges although not requiring the services of an operator are relative expensive since they require considerable switching equipment and require also relatively frequent maintenance.

In recent years for economic reasons there has been an increasing demand for a new type of service, for use instead of small manual or small automatic private branch exchanges, which has resulted in the development of what are known in the art as key telephone systems. In key telephone systems the services of an operator, required in the small manual private branch exchange service, are dispensed with and the automatic switching equipment required in the small automatic private branch exchanges is not required. Key telephone systems, however, are not as flexible in their operation as any of the private branch exchange systems which they are widely replacing. In key telephone systems it is not possible to switch connections, that is to say, it is not possible in existing systems to connect any station on a subscriber premises to any line. If a station is to have access to a line, the line must be terminated at the particular station. Further, it is not possible to establish connections between the stations on the premises, except by means of local intercommunicating circuits. There are many forms of business, however, where switching afforded by private branch exchanges is not required and the telephone needs of such subscribers are satisfactorily met by the relatively new and less expensive key telephone system service.

Key telephone systems are arranged to perform certain functions through the operation of keys located at each of the stations on the subscriber premises. It is possible, for instance, to respond to a call incoming over a particular line at any one of a number of stations, to each of which the particular line is connected in multiple and, if the particular station which responds is not the one with which the calling party wishes to communicate, the incoming call may be held, by operating a key at the station which first answers, until the particular station which is wanted can respond by operating a key thereat associated with the line which is being held. Key telephone systems also afford various orders of priority of access by stations to the lines to distant points. They also afford various degrees of privacy.

In key telephone systems the lines incoming from distant points extend first through relay equipment which controls the supervisory signals and holding function and then through relay equipment which controls the different degrees of access and privacy. Each line is then extended to the key control at some one subscriber station and then each line, if it is to be made available at more than one station, as most lines are, is multiplied to a key at each of the other stations. Several lines will ordinarily be connected individually to several keys at each station and the operation of a key will connect the associated line to the single telephone at the particular station. On outgoing calls a telephone at a subscriber's premises may be connected to any line appearing at the station by operating a key associated with the line at the particular station. Dependent upon whether or not a line is in service at the time and the order of priority assigned to the station, the connection between the station and the line will be established. The established connection once effected may remain intact or be interrupted by the operation of a key at another station dependent upon the order of priority and of privacy assigned to the different stations.

One of the major problems encountered in the use of key telephone systems is the provision of supervisory signals and controls for such signals which are reliable and economical. In many installations the key telephone systems are not in operation continuously but are actually in service, only as required, intermittently during a business day. Further they may be unattended for relatively long periods, such as over night or over a weekend.

In the case of a manual private branch exchange, as distinguished from a key telephone system, when a call is incoming from a central station a relay will be operated and a calling lamp, for instance, will be lighted at the private branch exchange. If, after a reasonable interval, there is no response the relay will be released and the lamp will be extinguished when a circuit is disconnected at the central office. Similarly at an automatic private branch exchange, equipment operated in response to an incoming call will be released when a circuit is disconnected at the central station. By contrast, in the case of key telephone systems the circuits are frequently arranged so that a calling signal, for instance, is locked in. That is to say, in response to an incoming call a relay on the subscriber's premises is locked in the operated position and a calling lamp controlled by the relay remains lighted for a predetermined interval before it is automatically released and the circuit restored to normal. Heretofore the interval has been established by means of a thermostatic switch which, in response to the heat generated during the predetermined interval, opens a circuit controlling the locked-in relay, extinguishing the lamp, Thermostatic switches are at times erratic. Too frequently they may fail to operate at all or when they do the intervals before operation vary widely from the normal interval. As should be apparent, failure of the thermostatic switch to operate at times, such as at night or during a weekend, when the system is unattended could result in the locking of a relay and the lighting of the lamps associated with each line over which an incoming call was attempted during the interval. This would tend to shorten the life of the relays and lamps and the battery on the premises supplying power to the equipment.

In certain key telephone systems the signaling lamps at the stations, to which a line is connected in multiple, are controlled in a number of different manners to indicate different conditions. The lamps may be flashed to indicate an incoming call, lighted steadily to indicate that the line is busy and flashed in a different manner, or winked as it is called, to indicate that it is being held until the wanted station answers.

In certain key telephone systems in addition to flashing lamps, a ringer is also operated to indicate that a call is incoming. The ringing may be interrupted with intervals of silence. The ringing and silent intervals of the ringing cycle may be controlled by apparatus located on the subscriber permises. Such intervals may be relatively long. For instance, the length of a ringing cycle may be six seconds, during two seconds of which ringing may be applied and during four seconds of which there may be silence. It is desirable, particularly when the key telephone system is operated intermittently, to arrange the circuit after periods of idleness so that there will not be an excessive delay before ringing starts. That is to say, it is desirable to arrange the ringing control so that after each of the many periods of idleness during a business day, for instance, the ringing cycle starts during the ringing interval, rather than during the silent interval. In short it is desirable to provide a number of different supervisory controls on the premises where key telephone systems are installed.

An object of the present invention is to improve key telehpone systems.

A more specific object of the present invention is to improve the ringing and supervisory signal controls of key telephone systems.

A feature of the invention is a more reliable control for measuring and terminating the supervisory signal intervals in key telephone systems.

A further feature of the invention is an arrangement for starting a cycle of ringing and silent intervals during the ringing interval in a key telephone system.

A further feature of the invention is an arrangement which permits the establishing of any desired interval, throughout a range, during which ringing and supervisory signals are permitted to continue while a station is unattended before signaling is stopped automatically in a key telephone system.

These and other features of the invention may be understood from a consideration of the following description when taken together with the associated drawing which disclose a preferred embodiment in which the invention is presently incorporated. It is to be understood, however, that the invention is not limited to the present embodiment but may be incorporated in other embodiments which will be readily suggested to those skilled in the art by the disclosure hereinafter.

Refer now to the drawing which shows in heavy lines in the bottom portion of the figure a motor driven interrupter for producing interruptions for lamp flashing, lamp winking and ringing cycles and a timing control for the motor driven interrupter which limits the interval during which the motor is permitted to actuate the interrupters to flash or wink the lamps or to operate the ringer. The timing apparatus is arranged so that different intervals may be established during which the motor may be driven, to suit the requirements at different installations at different times under various conditions. Key telephone system equipment, with which the interrupter and timer equipment will cooperate, is indicated in lighter lines in the upper portion of the drawing.

The interrupter and timer circuit of the present invention may be widely applied in its present form or with minor modifications which will be obvious to those skilled in the art to suit the particular needs of the circuits with which the arrangement of the present invention cooperates. Illustrative of the circuits, many of which are well known in the art, with which the present arrangement will cooperate are the circuits, shown in the lighter lines in the upper portion of the drawing, which are essentially the same as those of Fig. 1 and Fig. 2, of the key telephone system disclosed in my copending patent application Serial No. 429,176, filed May 12, 1954, which is hereby incorporated herein by reference as though fully set forth herein.

The interrupter and timer circuit of the present invention employs a motor driven interrupter, instead of a relay system, and a timer driven by the motor, instead of a thermostatic timer, to control the signals in a key telephone system. It is arranged so that when a call is incoming to the key telephone system, the motor is set in motion and an interval is measured by the associated timing apparatus during which the motor is permitted to run before it is shut down. As mentioned heretofore this interval may be varied throughout a range to suit requirements. There are presently available various controls for performing the timing function. Generally the timing control in such an arrangemeint is a thermostatic switch. The present interrupter and timer circuit afford improvements in operation over the thermostatic switch controlled circuits.

In the following description when the values of constants are mentioned it is to be understood that the constants specified are by way of example. The small circles shown in the present drawing indicate a connection to battery of the polarity indicated by the symbol within the circle, the opposite pole of the battery being connected to ground.

When a call is incoming to a particular premises, where a key telephone system is located, ringing may be applied to the line at the distant office to operate a relay, frequently called the ringing relay, or R relay, such as relay R in the line circuit or a corresponding relay in any similar circuit. In response to this, battery will be supplied through contact 54 of the present circuit, conductor 101, bottom innermost break contact of relay A and the innermost make contact and bottom winding of ringing relay R to ground, to lock the ringing relay. The operation of such a relay will connect ground through a contact to conductor 104, contact 50, winding of the 60-cycle synchronous clock-type motor 2 and source of alternating current 1, to ground, driving the motor. The motor drives shaft 3 and cam 4 integral therewith at the rate of one revolution per second. Cam 4 has a raised projection 5 thereon which coacts with follower 6 to open contact 7 for approximately .025 second once per second to provide a winking lamp supply. Negative battery 126 in the line circuit is connected through conductor 108, contact 7, conductor 111 and through the line circuit to wink lamp LAB under control of a relay, called a holding relay, or H relay, such as relay H in the line circuit, when the holding relay is operated for a line holding condition.

Shaft 3 is coupled through a 6-to-1 gear reduction train 8 to shaft 9 on which are integrally mounted cams 10 and 16 which cams are rotated once every six seconds. Cam 10 has six projections and six depressions which actuate follower 13, providing .5 second open and .5 second closed intervals of contact 14. The battery 126 is supplied through conductor 108, contact 14, when closed, and conductor 107 which extends through a contact of the R or ringing relay in the line circuit to flash a lamp, such as lamp LAB, when the ringing or R relay is operated, as a line calling condition prior to answering or holding the line.

Cam 16 has a raised periphery throughout one third of its surface and a depressed periphery throughout the remaining two thirds. It actuates a pair of armatures through follower 19, and insulating element 20 integral therewith, to close contact 22 for a two-second ringing interval and to open it for a four-second silent interval in a ringing cycle to control a ringer while the line calling condition prevails. Conductors INT1, INT2 and contact 22 may be introduced into the path between the alternating-current supply and the ringer in the line circuit such as between source 130 and ringer 131 to permit this. During the silent interval a circuit may be traced from ground through contact 21 to the left-hand terminal of the motor. This prevents the motor from stopping while follower 19 is in engagement with the depressed periphery 17 of ringing interrupter 16, so that the motor will not be permitted to stop at any time during a silent interval. This ensures that, after any interval during which the motor driven interrupter has been shut down, ringing will start immediately on any incoming call. This is one of the important aspects of the invention. It is particularly pointed out that the present motor driven interrupter is arranged so that it will be idle at all times except when the lines or trunks connecting the subscriber premises are actually in service. There will generally be many such intervals during the ordinary business day in many establishments. A four-second interval of delay after a long period of idleness, such as after a night or a weekend, would ordinarily be of no consequence. However, in a system which has alternate intervals of service and idleness hundreds of times in the course of the business day, the saving of this interval is of importance.

The shaft 9 is coupled to the shaft 24 through the 100-to-1 gear reduction train 23 which is arranged to rotate shaft 24 one revolution in ten minutes. The shaft 24 is coupled to the shaft 25 through the left-hand clutch driving member 26*a*, right-hand clutch driven member 26*b* and a spring, not shown, positioned between them, which spring tends to disengage driven member 26*b* from driving member 26*a*. Normally magnet 32 is deenergized and the driven element 26*b* is maintained in engagement with the driving element 26*a* by bell crank lever 27, which is rotated clockwise in a limited arc about fulcrum 28 under the influence of spring 30. Spring 30, at its upper end, is secured to the horizontal arm of the bell crank lever through pin 29 and at its lower end is secured to pin 31. When magnet 32 is deenergized, a horizontal projection, extending toward the left, at the lower end of the vertical element of the bell crank lever 27, engages the right-hand face of the driven element 26*b*, urging it toward the left against the influence of the spring, not shown, into engagement with the clutch driving element 26*a*. When magnet 32 is energized, in a manner to be described, bell crank lever 27 is rotated counterclockwise, against the influence of spring 30, disengaging the bell crank lever from the clutch driven element 26*b* which in turn is disengaged from the clutch driving element 26*a* by the spring, not shown.

Helical spring 55 has one end secured to pin 57 on shaft 25 and the other end secured to fixed pin 56. When shaft 25 is driven, spring 55 is tensioned. When shaft 25 is uncoupled, through the clutch, the shaft is restored by spring 55 to its zero position. Cam 36 is integral with shaft 25 and its function will be described hereinafter. Cams 41 and 44 are integral with hollow shaft 42. Hollow shaft 42 is concentric with shaft 25 and is rotatable thereon. Hollow shaft 42 may be secured in any angular position on shaft 25 by means of set screw 43. Dial 40 is free of shaft 25, being fixed and nonrotatable. The dial 40 is engraved, stamped or otherwise marked on its face, as shown, with numerals from zero to nine, each spaced one from another arcuately at equal 36-degree angles throughout a circumference. The digital numerals represent each of the ten minutes in the ten-minute interval of rotation of shaft 25. Cam 41 is positioned in registry with dial 40. Cam 41 is generally circular having one raised projection 46 on its periphery. In the normal undisplaced position of the timing mechanism, projection 46 will be in registry with zero on dial 40. In resetting the cams for a particular timing interval, set screw 43 is rotated to free sleeve 42 and the sleeve together with cams 41 and 44, integral with the sleeve, are rotated counterclockwise, to any desired position, with the projection 46 registering with the position on dial 40 corresponding to the number of minutes and fractions thereof during which it is desired to permit the motor 2 to operate and the flashing, winking and ringing interrupters to function, in response to an incoming call, before the system is shut down. Then the sleeve 42 and cams 41 and 44 are locked in position by means of the set screw 43.

It has been explained that when a call is incoming over any of the line circuits the motor 2 is set in operation. The line circuit may be arranged so that when a call is answered by the called party, a relay in the line circuit, responsive to the answering, usually identified as the answering relay, such as the A relay in the line circuit, is actuated, which disconnects the battery supplied through contact 54 and conductor 101 to release the locked-up ringing relay which responded to the incoming call. The release of the responding ringing relay may also disconnect the ground which was supplied through conductor 104 over the path heretofore traced to the motor 2, stopping the motor.

When a call is answered by the called party, the present circuit is arranged also to disconnect the timing mechanism and permit it to be restored to the zero or start timing position. This may be performed by applying ground to conductor 102 from the contacts of the answering relay. The circuit then extends through the winding of magnet 32 to battery, energizing magnet 32 and disengaging the clutch. Simultaneously contact 33 will be closed and, during the interval while the timing mechanism is being restored to normal, under the influence of spring 55, cam 36 will maintain its follower 38 in its elevated position, closing contact 39, maintaining magnet 32 energized until the timing mechanism is fully restored, at which point follower 38 will be centered in the depression 37 in the periphery of cam 36, contact 39 will be opened and magnet 32 released. Bell crank lever 27 will then be actuated by spring 30 to recouple the driven shaft of the timer to the driver.

The line circuit, as mentioned, is arranged so that a line may be held at a particular station until the particular called party responds at another station connected to the same line. During the interval while the line is held, as also explained, the holding relay, such as relay H, in the line circuit is operated and the line lamp associated with the line at each station is winked. To hold the line requires a manual operation, such as the actuation of a key in the line key circuit, and the fact that the line is held indicates that the key telephone system is attended. It is desirable under these circumstances also to disconnect the timing mechanism and permit it to return to normal so as to measure a full predetermined interval before it times out the next time it functions. However, the motor must be maintained in operation in order to continue to wink the lamp to indicate that the line is being held. The disconnection of the timing mechanism under this condition is performed by a circuit which may be traced from battery through the winding of relay WS and conductor 103 to ground on the contact on the operated hold relay, such as relay H in the line circuit, operating relay WS. The closing of contact 61 establishes a circuit from ground through contact 61, and contact 50 to the left-hand terminal of the motor 2, which maintains the motor in operation. The closing of contact 60 supplies ground to the winding of magnet 32, energizing the magnet, and disconnecting the timing mechanism.

The present interrupter and timer circuit includes also certain additional features which will now be described. As heretofore explained, in the event that the call is not answered, at some predetermined time after the motor has been set in operation, dependent upon the setting of the timer, projection 45 on cam 44 will actuate follower 51, opening contact 54. This will release the ringing relay which in turn will disconnect ground from conductor 104. However, motor 2 will not be stopped immediately, as contact 53 is closed simultaneously with the opening of contact 54. This establishes a circuit, for a short interval, from ground through contact 34, contact 53 and contact 50 to the left-hand terminal of the motor 2. The purpose of this is to ensure that the responding relay in the line circuit has time to fully release before motor 2 is shut down. Otherwise, if the rotation of the timer shaft 25 were stopped instantaneously before this relay had fully released, the relay might reoperate, particularly if there were any play in shaft 25, sleeve 42, or in the cam 44. At the termination of this short interval, projection 46 on cam 41 engages follower 47 closing contact 49 and opening contact 50 through insulator 48 which is integral with follower 47. The duration of the short interval may be established by fixing the arcuate relationships of projections 45 and 46. The closing of contact 49 establishes a circuit from ground through contact 49 and the winding of magnet 32 to battery, energizing the magnet actuating the bell crank lever, releasing the clutch and permitting the timing mechanism to be restored. The opening of contact 50 through which the energizing circuit of the motor has been traced prevents damage to the timing apparatus should it fail to restore due to faulty operation or failure of clutch release power.

What is claimed is:

1. A key telephone system on a subscriber premises, a telephone line in said system incoming from a remote point to said premises, a motor on said premises, a telephone line calling signal connected to said line on said premises, a signal interrupter driven by said motor, a timer driven by said motor connected to said signal for controlling said signal, means responsive to a call incoming over said line for starting said motor and actuating said signal, means responsive to the answering of said call for stopping said motor, and means responsive to the elapse of an interval measured by said timer, during which said call is unanswered, for stopping said motor.

2. A motor in a key telephone system, an interrupter driven by said motor, telephone signals controlled by said interrupter, a timer responsive to the operation of said motor, means for starting said motor in response to an incoming call, means for stopping said motor in response to the answering of said call, means in said timer for measuring a predetermined interval during which an incoming call may be unanswered, and means for stopping said motor at the end of said interval.

3. In a key telephone system, a signal interrupter, a timer, a motor for driving said interrupter and said timer, means, responsive to the driving of said timer, for measuring an interval during which said motor is permitted to operate said signal interrupter before stopping said motor, means responsive to the termination of said interval for stopping said motor, means responsive to the prior answering of an incoming call for stopping said motor, and clutch and spring means responsive to the answering of said call for resetting said timer so as subsequently to start again measuring said interval.

4. In a key telephone system, a motor driven interrupter, telephone signal control means responsive to said interrupter, means for starting said interrupter in response to an incoming call, means for stopping said interrupter in response to the answering of said call, and timing means controlled by said motor for stopping said interrupter at the end of a measured interval when said call is unanswered during said interval.

5. In a key telephone system, a synchronous motor, a telephone circuit control signal interrupter driven by said motor, a timer, for measuring an interval during which said signals are permitted to operate, driven by said motor, a clutch connecting said motor to said timer, means responsive to an incoming call for starting said motor, said interrupter and said timer, means responsive to the answering of said call for actuating said clutch to disengage said timer, means responsive to said disengagement for restoring said timer to normal so as to thereafter start the timing of a new interval at zero.

6. A system in accordance with the last preceding claim including means for continuing to drive said motor and said interrupters, while maintaining said timer disconnected in response to the holding of an incoming call.

7. A key telephone system having a telephone line circuit connected at a subscriber's location to a plurality of subscriber station circuits in parallel, a signal connected to said line, a synchronous motor controllable by said line circuit responsive to a call incoming over said line circuit to said stations, a plurality of interrupters driven by said motor, means in said line circuit responsive to the actuation of said line circuit, for selectively connecting said signal to said plurality of interrupters so as to actuate said signal in a plurality of manners, a shaft connected through a clutch to said motor, a timing mechanism connected to said shaft, means connected to said timing mechanism and said line circuit for maintaining said motor in operation incident to the actuation of said signal by said interrupters in a first manner, and means incident to the actuation of said signal by said interrupters in a second manner for a protracted interval, as measured by said timer, for stopping said motor.

8. A system in accordance with claim 7 having also a ringing interrupter driven by said motor, ringing signal means in said system, a circuit interconnecting said ringing interrupter and said ringing signal means, means including said ringing interrupter, responsive to a call incoming over said line circuit, for producing a ringing and a silent interval in each cycle of operation of said ringer, means responsive to the answering of an incoming call for stopping said ringing, and means connected to said interrupter responsive to the answering of a call during a silent interval for preventing the stopping of said motor.

9. In a key telephone system, a telephone line circuit, a synchronous motor, a plurality of cam type interrupters driven by said motor, said motor controllable by said telephone line circuit, said line circuit interconnecting a telephone office to a plurality of subscriber station circuits on a subscriber premise, means responsive to a call incoming over said line to said station circuit for starting said motor and driving said interrupter, a timing mechanism interconnectable through clutch means to said motor, means responsive to the start of said motor for initiating the driving of said timing mechanism through said clutch, means in said timing mechanism and said line circuit responsive to the measurement of a predetermined interval by said mechanism for stopping said motor when a call has not been answered during the interval, other means in said line circuit responsive to the answering of a call during said interval for stopping said motor, means for restoring said timer to the zero timing condition when said motor is stopped, said last means comprising a relay responsive to said stopping for disengaging said clutch, a spring for rotating said timer to the zero condition while said clutch is disengaged, a timer restoring cam actuated by said spring, a contact controlled by said restoring cam and a motor driving circuit controlled by said contact for preventing said motor from stopping until the zero timing position of said timer is attained.

(References on following page)

References Cited in the file of this patent

UNITED STATES PATENTS

| | | |
|---|---|---|
| 1,724,903 | Bowne | Aug. 20, 1929 |
| 2,225,907 | Duguid | Dec. 24, 1940 |
| 2,278,702 | Knittle | Apr. 7, 1942 |
| 2,496,159 | Hagens | Jan. 31, 1950 |

OTHER REFERENCES

Telephony, Atkinson, vol. I, pages 443–4 (TK6161H57, 1948).